United States Patent
Nagashima et al.

(10) Patent No.: US 6,709,048 B2
(45) Date of Patent: Mar. 23, 2004

(54) STRUCTURE MOUNTING ROOF MOLDING ON VEHICLE

(75) Inventors: Setsuko Nagashima, Kanagawa-ken (JP); Tetsuo Itou, Chiba-ken (JP)

(73) Assignees: Nissan Motor Co., LTD, Kanagawa-Ken (JP); Kinugawa Rubber Industrial Co., Ltd., Chiba-Ken (JP)

(*) Notice: Subject to any disclaimer, the term of this patent is extended or adjusted under 35 U.S.C. 154(b) by 0 days.

(21) Appl. No.: 10/157,805

(22) Filed: May 31, 2002

(65) Prior Publication Data
US 2002/0180246 A1 Dec. 5, 2002

(30) Foreign Application Priority Data
Jun. 1, 2001 (JP) ..................... P2001-166689

(51) Int. Cl.[7] ............................................. B62D 25/06
(52) U.S. Cl. ...................................................... 296/210
(58) Field of Search ................................. 296/210, 213

(56) References Cited

U.S. PATENT DOCUMENTS 4,930,279 A * 6/1990 Bart et al.
5,013,083 A * 5/1991 Yada et al.
5,413,398 A * 5/1995 Kim
5,829,825 A * 11/1998 Kim
2001/0000016 A1 * 3/2001 Sugiura

FOREIGN PATENT DOCUMENTS

| DE | 94 19 781 | 3/1995 |
| EP | 0 816 175 | 1/1998 |
| EP | 10076886 | 3/1998 |
| JP | 10-76886 | 3/1998 |

* cited by examiner

Primary Examiner—D. Glenn Dayoan
Assistant Examiner—Lori L Coletta
(74) Attorney, Agent, or Firm—McDermott, Will & Emery

(57) ABSTRACT

A roof molding mounting structure of a vehicle is constituted by a groove portion (2) formed along a longitudinal direction of the vehicle, and a roof molding (8) arranged within the groove portion (2). The groove portion (2) is formed in an inverse structure in which a left wall portion (6) and a right wall portion (7) are inward inclined. The roof molding (8) has a head portion (12) positioned above the groove portion (2), a main lip (13) having a front end portion elastically in contact with at least one of the left wall portion (6) and the right wall portion (7) in a lower side of the head portion (12), and a leg portion (15) elastically in contact with a bottom surface of the groove portion (2). A leg portion (15) of the roof molding (8) is elastically deformable in a vertical direction of the groove portion (2), and has a hollow portion.

12 Claims, 5 Drawing Sheets

STRUCTURE MOUNTING ROOF MOLDING ON VEHICLE

BACKGROUND OF THE INVENTION

1. Field of the Invention

The present invention relates to a structure mounting a roof molding on a vehicle.

2. Description of the Related Art

A conventional roof of a motor vehicle includes a structure in which a groove portion extending along a longitudinal direction of a vehicle is formed between a roof panel and a side outer panel and a roof molding for ornament is mounted in an inner portion of the groove portion (refer to Japanese Patent Application Laid-Open No. H10-76886 as a similar art).

The groove portion has an inverse structure in which right and left wall portions are inclined inward to each other. Respective bottom surface portions of the roof panel and the side outer panel are bonded to each other according to a spot welding or a laser welding. A paint seal for waterproofing is also applied to the bottom surface of the groove portion. In the case of the laser welding, a laser trail is generated on the bottom surface of the groove portion. Therefore, the particularly thick paint seal needs to be applied to a whole of the bottom surface of the groove portion.

The roof molding is an extrusion-molded product formed by an elastic member such as a rubber or the like. The roof molding is provided with a head portion positioned in an upper side of the groove portion, a pair of main lips being elastically in contact with right and left wall portions in a lower side of the head portion, and a leg portion brought into contact with the bottom surface of the groove portion. The head portion forms an ornamental design surface in the case of viewing the groove portion from the above. The main lip generates a holding force within the groove portion, and holds an attitude of the roof molding in a lateral direction. The leg portion restricts a vertical position of the roof molding within the groove portion. The leg portion has a solid convex shape, is formed downward from the roof molding, and has the same elastic hardness as a main body of the roof molding.

SUMMARY OF THE INVENTION

However, in the conventional art, in the case that a dispersion of a depth of the groove portion is generated due to an error in forming the groove portion, an error in a thickness of the paint seal application layer or the like, since the leg portion of the roof molding brought into contact with the bottom surface of the groove portion is solid and has a predetermined elastic hardness, the dispersion of the depth of the groove portion is also generated at upper and lower positions of the roof molding. As a result, the head portion surface of the roof molding becomes wavy in the longitudinal direction, thereby causing a reduction of outer appearance of the vehicle.

The groove portion has the inverse structure, so that the elastically contact position of the main lip with the wall portion varies when the dispersion is generated at the upper and lower positions of the roof molding. The elastically contact position of the main lip with the wall portion varies to a narrow upper side, then the main lip needs to elastically contact with the wall portion in a very close state. There is a risk that the roof molding floats up more than necessary due to a surplus reaction force generated by the above-described forced elastic contact.

An object of the present invention is to provide a structure mounting a roof molding on a vehicle, which can mount a roof molding at a predetermined height along a longitudinal direction of the vehicle.

The first aspect of this invention provides a structure mounting a roof molding on a vehicle, comprising: (a) a groove portion arranged between both right and left end portions of a roof panel and a side outer panel, in which a wall portion of the roof panel and a wall portion of the side outer panel are inclined inward and opposed to each other, a bottom surface thereof is formed by a method that a bottom surface portion of the roof panel and a bottom surface portion of the side outer panel are bonded, and formed along a longitudinal direction of the vehicle, the groove portion comprising: a first wall portion constituting a left wall surface of the groove portion; and a second wall portion opposing to the left wall surface of the groove portion and constituting a right wall surface of the groove portion, and (b) a roof molding arranged within the groove portion, comprising: a head portion positioned in an upper side of the groove portion; a main lip that a front end portion thereof elastically contacts with at least one of the first wall portion and the second wall portion in a lower side of the head portion; and a downward leg portion brought into contact with the bottom surface of the groove portion, wherein the roof molding is formed along the longitudinal direction of the vehicle, and the leg portion includes a hollow portion having an elastically deformable structure in a vertical direction of the groove portion.

DETAILED DESCRIPTION OF THE PREFERRED EMBODIMENTS

A description will be given below preferred embodiments according to the present invention with reference to the accompanying drawings.

Figure 1:
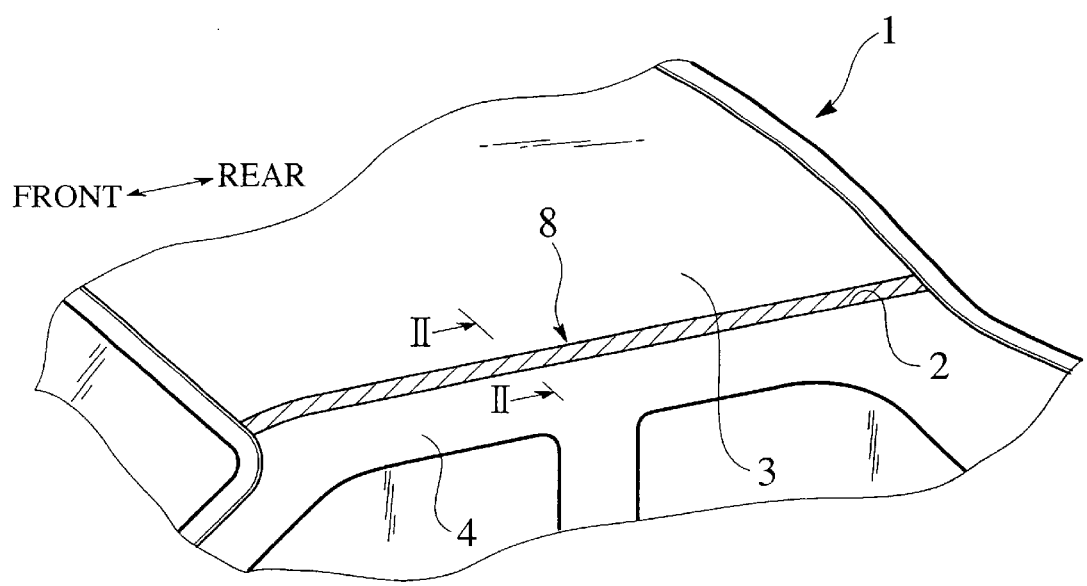
FIG. 1 shows a perspective view of a roof showing a roof molding mounting structure according to a first embodiment of the present invention.
Figure 2A:
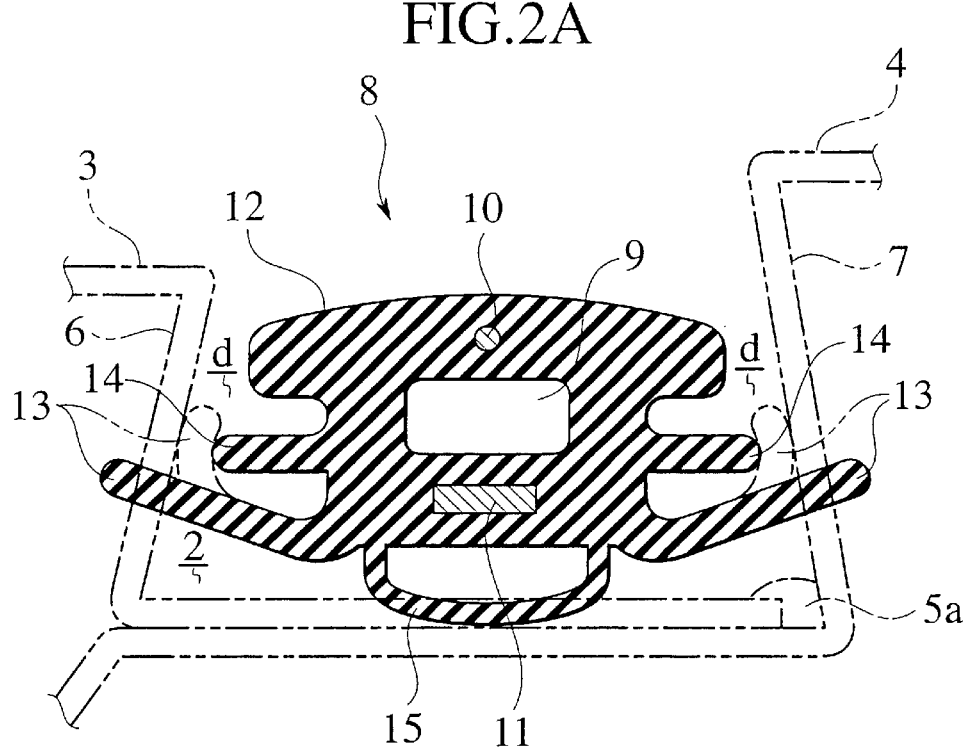
FIGS. 2A and 2B show a cross sectional view along a line II—II in FIG. 1, showing a structure of a roof molding according to a first embodiment of the present invention.
Figure 2B:
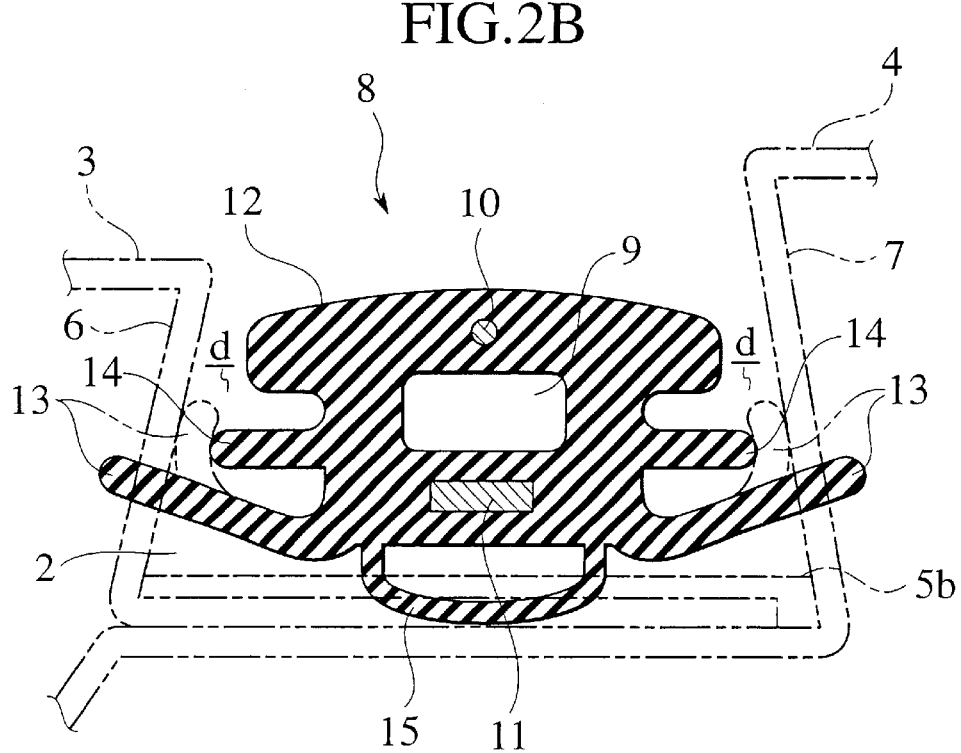

FIGS. 1, 2A and 2B show a first embodiment according to the present invention. Groove portions 2 extending along a longitudinal direction are formed in both of right and left sides of a roof 1. The roof 1 is formed by a roof panel 3 and upper surfaces of side outer panels 4. The groove portions 2 are formed between both end portions in a width direction of a vehicle in the roof panel 3, and the side outer panels 4. The roof panel 3 and the side outer panels 4 are spot welded to each other in a state of setting the roof panel 3 upward, within the groove portion 2 (refer to a spot welding part 5a in FIG. 2A). The roof panel 3 and the side outer panels 4 can be bonded to each other according to a laser welding (refer to a laser welding part 5b in FIG. 2B). A paint seal 5 for waterproofing is applied to the end portions being bonded by the spot welding or the laser welding along a longitudinal direction of the vehicle. The groove portion 2 has an inverse structure in which a left wall portion 6 and a right wall portion 7 are inward inclined. The right wall portion 7 in a side of the side outer panel 4 is formed to be higher than the left wall portion 6 in a side of the roof panel 3. According to the above-described structure between the roof panel 3 and the side outer panel 4, it is possible to prevent a drop of water on the roof 1 from dropping to a door side over the side outer panel 4.

A roof molding 8 for ornamental use is mounted within the groove portion 2. The roof molding 8 is an extrusion-molded product by an elastic member such as a rubber, and has the same cross sectional shape along the longitudinal direction of the vehicle. A cavity portion 9 for weight saving of the roof molding 8 is formed in a center of the roof molding 8. A round bar-like core member 10 and a plate-like core member 11 for stabilizing a shape of the roof molding 8 are insert molded in upper and lower portions of the cavity portion 9.

An upper portion of the roof molding 8 corresponds to a head portion 12, and an upper surface of the head portion 12 is exposed from the groove portion 2, so as to form an ornamental design surface. Both left and right end portions of the head portion 12 are apart from both the left wall portion 6 and the right wall portion 7 at a predetermined distance, respectively. Due to this distanced structure between the head portion 12 and the left and right wall portions 6, 7, a drip groove d for a water drain is formed between the head portion 12 and the left and right wall portions 6, 7. The water reaching the groove portion 2 can be drained to forward and backward portions in the vehicle via the drip groove d.

Main lips 13 are respectively formed in lower portions in both of right and left sides of the roof molding 8. The main lips 13 are formed to be sufficiently longer than a distance between the left wall portion 6 and the right wall portion 7. The main lips 13 elastically contact with both the left wall portion 6 and the right wall portion 7 in a state of being deflected upward. Therefore, it is possible to secure a holding force for preventing the roof molding 8 from coming off from the groove portion 2. Further, it is possible to securely hold an attitude of the roof molding 8 within the groove portion 2.

Sub lips 14 are formed between the head portion 12 and the main lips 13. The sub lips 14 are shorter than the main lips 13. The sub lips 13 are apart from both the left wall portion 6 and the right wall portion 7 at an interval corresponding to a thickness of the main lip 13, so that the left and right wall portions 6, 7 and the sub lips 14 can grip the main lip 13 deflecting upward. The left and right wall portions 6, 7 and the sub lips 14 grip the main lip 13, whereby a force for holding the roof molding 8 within the groove portion 2 is increased.

A leg portion 15 having a hollow structure is formed downward in a lower surface of the roof molding 8. The leg portion 15 elastically contacts with the bottom surface of the groove portion 2. The leg portion 15 is elastically deformable in a vertical direction, such that it is possible to absorb dispersion of a depth of the groove portion 2 due to deformation of the leg portion 15. Therefore, the roof molding 8 can be mounted at a regular height within the groove portion 2, whereby the surface of the head portion 12 in the roof molding 8 does not rise and fall in the longitudinal direction of the vehicle. Accordingly, an outer appearance is improved. Further, the main lip 13 also elastically contacts with both the left wall portion 6 and the right wall portion 7 at a predetermined height, thereby the main lip 13 does not become in a very close state and the roof molding 8 does not float more than necessary.

Figure 3A:
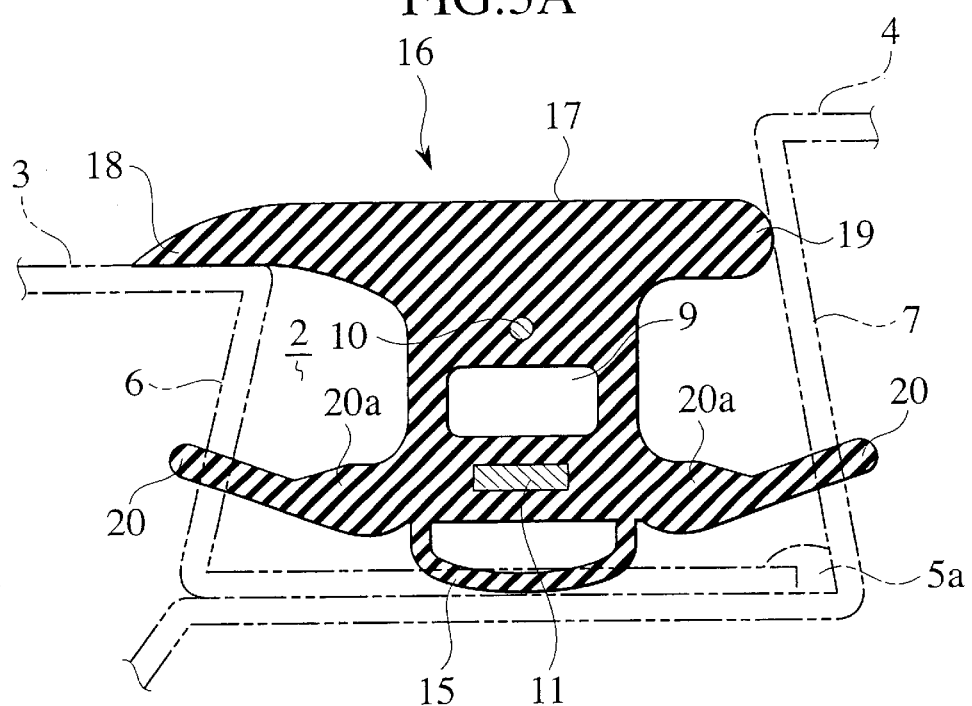
FIGS. 3A and 3B show a cross sectional view showing a roof molding according to a second embodiment of the present invention.
Figure 3B:
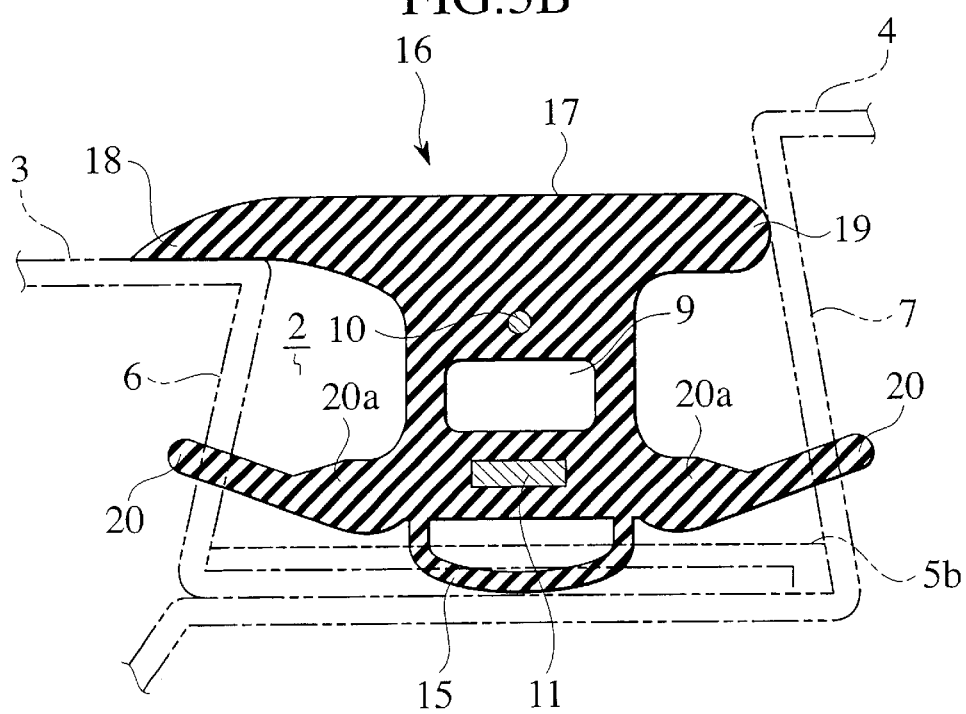

FIGS. 3A and 3B show a second embodiment according to the present invention. A roof molding 16 according to the second embodiment is obtained by modifying the structure of the first embodiment. As the same as the first embodiment, the roof panel 3 and the side outer panels 4 are spot welded to each other in a state of setting the roof panel 3 upward, within the groove portion 2 (refer to a spot welding part 5a in FIG. 3A). The roof panel 3 and the side outer panels 4 can be bonded to each other according to a laser welding (refer to a laser welding part 5b in FIG. 3B). An extension lip 18 is formed in a left end of a head portion 17 and contacts with a top of the roof panel 3. An upper projection portion 19 is formed at a right end of the head portion 17 and contacts with the right wall portion 7. A front end of the extension lip 18 has a tapered cross sectional shape closely attached to the surface of the roof panel 3. Thus, even when being exposed to both a water pressure at a time of car washing and a wind pressure at a time of driving, the front end of the extension lip 18 does not work up. A thickness of a root portion 20a of the main lip 20 is larger than that of a front end portion (it is preferable that a ratio of the thickness of the root portion 20a with respect to that of the front end portion is about 2 to 4 times.).

According to the second embodiment, the extension lip 18 is formed in the left end of the head portion 17, so that the extension lip 18 and the roof panel 3 contact with each other, whereby it is possible to prevent the roof molding 16 from rotating within the groove portion 2. Further, an area of the head portion 17 of the roof molding 16 exposing from the groove portion 2 is expanded, thereby an outer appearance performance of the vehicle is improved. The thickness of the root portion 20a of the main lip 20 is made larger than that of the front end portion, such that the holding force of the roof molding 16 can be increased while maintaining a following characteristics of the main lip 20 to the left and right wall portions 6, 7. Moreover, the upper projection portion 19 is formed at the right end of the head portion 17 and contacts with the right wall portion 7, whereby it is possible to prevent the roof molding 16 from rotating due to the reaction force from the extension lip 18, and the attitude of the roof molding 16 can be stabilized within the groove portion 2.

Figure 4A:
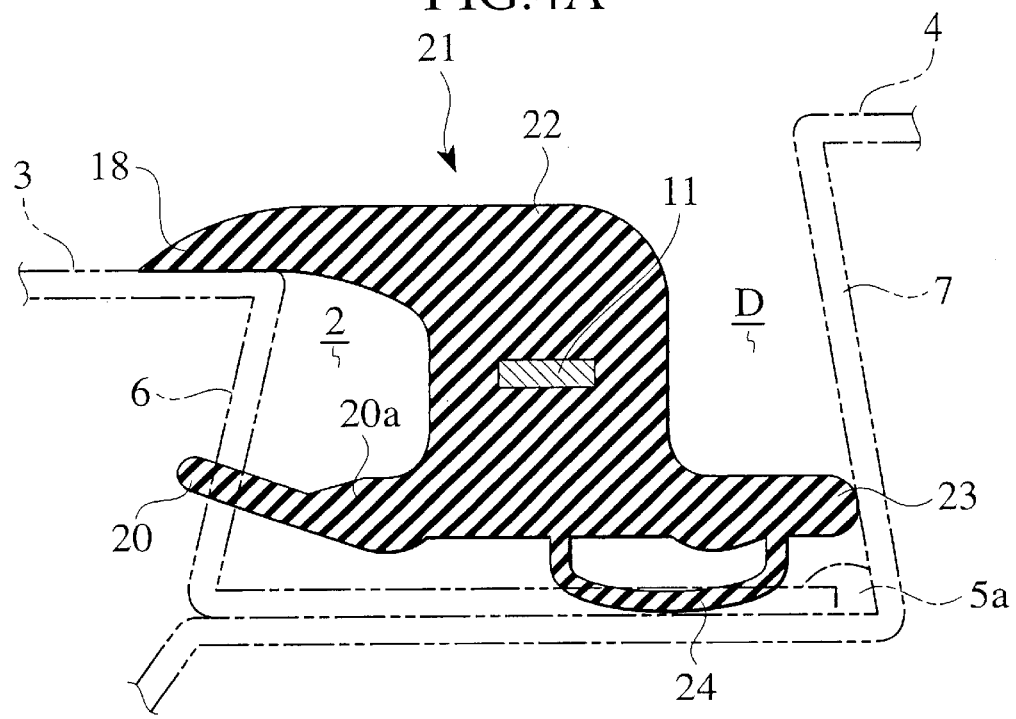
FIGS. 4A and 4B show a cross sectional view showing a roof molding according to a third embodiment of the present invention.
Figure 4B:
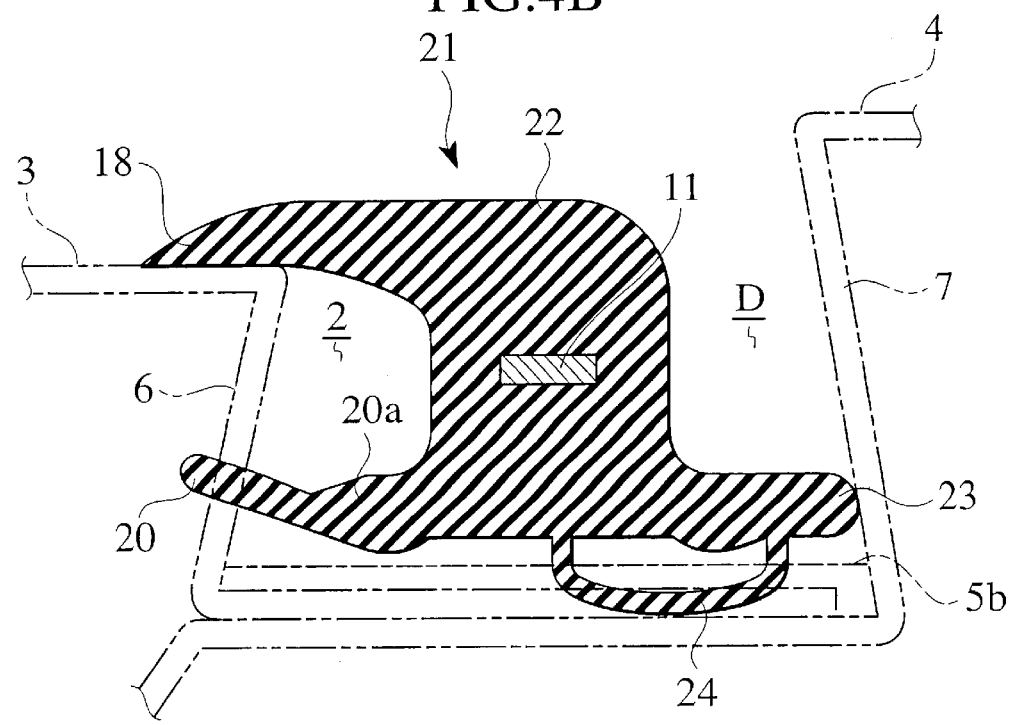

FIGS. 4A and 4B show a third embodiment according to the present invention. A roof molding 21 according to the third embodiment is obtained by modifying the structure of the second embodiment. As the same as the second embodiment, the roof panel 3 and the side outer panels 4 are spot welded to each other in a state of setting the roof panel 3 upward, within the groove portion 2 (refer to a spot welding part 5a in FIG. 4A). The roof panel 3 and the side outer panels 4 can be bonded to each other according to a laser welding (refer to a laser welding part 5b in FIG. 4B). A drip groove D for a water drain is formed between a right end of a head portion 22 and the right wall portion 7 by the right end of the head portion 22 being apart from the right wall portion 7 while forming the extension lip 18 in a left end of the head portion 22.

Alternating with the main lip 20 in a side of the side outer panel 4, a lower projection portion 23 being contact with the right wall portion 7 is provided. Further, a leg portion 24 is displaced to a side of the side outer panel 4. Removing both the cavity portion 9 and the round rod-like core member 10 according to the first and second embodiments, the plate-like core member 11 is only provided.

According to the third embodiment, the drip groove D is larger than the drip groove d according to the first embodiment. Therefore, it is possible to securely drain the water reaching on the roof molding 21 from the roof panel 3. The lower projection portion 23 contacts with the right wall portion 7, and the leg portion 24 is displaced to the side of the side outer panel 4, so that the attitude of the roof molding 21 within the groove portion 2 becomes stable even when the right end of the head portion 22 is apart from the right wall portion 7. Both the cavity portion 9 and the round rod-like core member 10 are removed and the plate-like core member 11 is only provided, thereby the shape of the roof molding 21 in the longitudinal direction of the vehicle can be stabilized.

Figure 5:
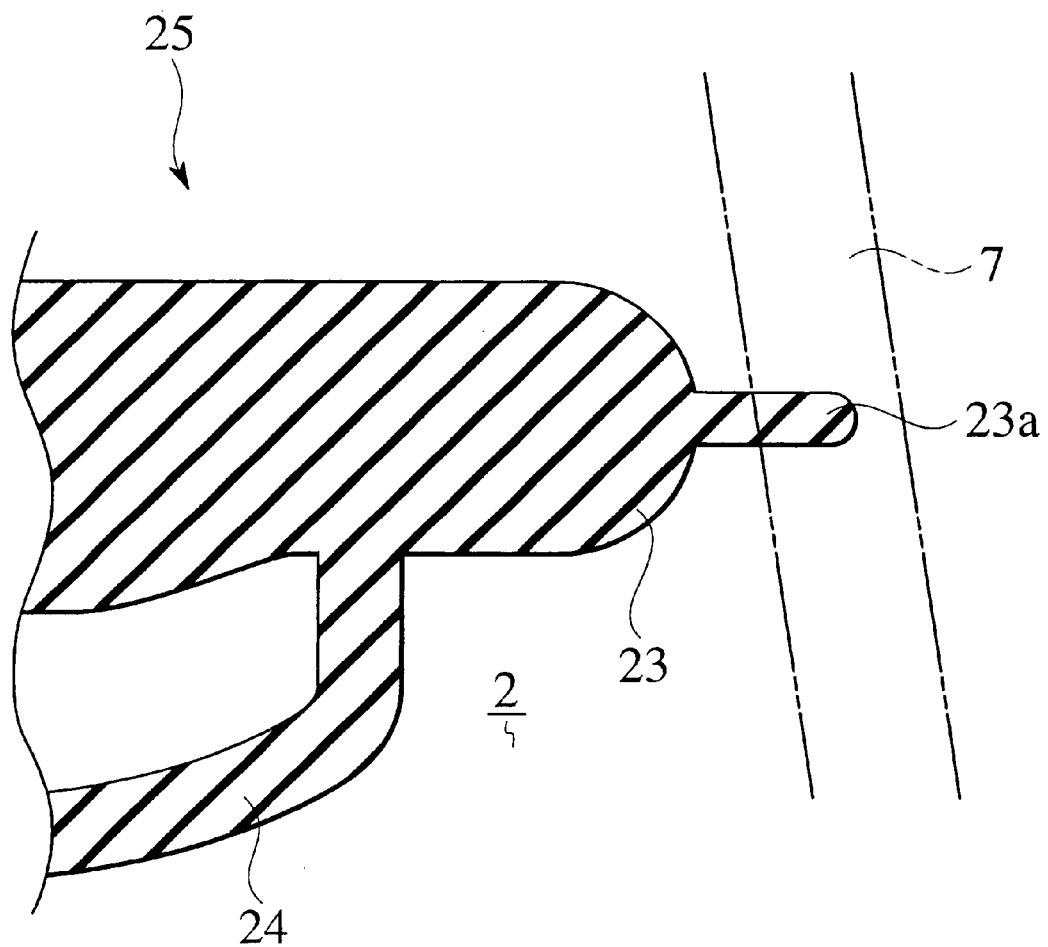
FIG. 5 shows an enlarged cross sectional view showing a lower projection portion in which a small lip is formed, in a roof molding according to a fourth embodiment of the present invention.

FIG. 5 shows a fourth embodiment according to the present invention. The fourth embodiment corresponds to a structure obtained by modifying the structure of the lower projection portion 23 according to the third embodiment. A small lip 23a is provided at a front end of the lower projection portion 23. It is desirable that a length in a width direction of the small lip 23a is smaller than that of the lower projection portion 23. The length of the small lip 23a in the width direction makes too long, then an elastic contact amount between the lower projection portion 23 and the right wall portion 7 becomes too large. The small lip 23a is provided at the front end of the lower projection portion 23, so that it is possible to reduce a measurement error in a width direction of the groove portion 2, and an attitude of a roof molding 25 can be stabilized within the groove portion 2.

The present disclosure relates to subject matters contained in Japanese Patent Application No. 2001-166689, filed on Jun. 1, 2001, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A structure for mounting a roof molding on a vehicle, comprising:

(a) a groove portion arranged between both right and left end portions of a roof panel and a side outer panel, in which a wall portion of the roof panel and a wall portion of the side outer panel are inclined inward and opposed to each other, a bottom surface thereof is formed by a method that a bottom surface portion of the roof panel and a bottom surface portion of the side outer panel are bonded, and formed along a longitudinal direction of the vehicle, the groove portion comprising:
a first wall portion constituting a left wall surface of the groove portion; and
a second wall portion opposing to the left wall surface of the groove portion and constituting a right wall surface of the groove portion, and (b) a roof molding arranged within the groove portion, comprising:
a head portion positioned in an upper side of the groove portion;
a main lip that a front end portion thereof elastically contacts with at least one of the first wall portion and the second wall portion at a lower half side in a height of the first and second wall portions; and
a downward leg portion brought into contact with the bottom surface of the groove portion, wherein the roof molding is formed along the longitudinal direction of the vehicle, and the leg portion includes a hollow portion having an elastically deformable structure in a vertical direction of the groove portion, wherein the hollow portion is offset in a lateral direction of the groove portion.

2. A structure for mounting a roof molding on a vehicle according to claim 1, wherein the roof molding further comprising:
a first sub lip arranged in a side of the roof panel; and
a second sub lip positioned at the same height as the first sub lip and arranged in a side of the side outer panel opposing to the roof panel, wherein one front end portion deflecting upward in the main lip is gripped by both the first wall portion of the groove portion and the first sub lip, and another front end portion deflecting upward in the main lip is gripped by both the second wall portion of the groove portion and the second sub lip, and wherein the first sub lip and the second sub lip are arranged above the main lip and provided on the roof molding.

3. A structure for mounting a roof molding on a vehicle according to claim 1, wherein a thickness of a root portion of the main lip is set to be larger than that of the front end portion of the main lip.

4. A structure for mounting a roof molding on a vehicle according to claim 1, wherein an extension lip is formed at a left end of the head portion of the roof molding and contacts with the roof panel.

5. A structure for mounting a roof molding on a vehicle according to claim 4, wherein a front end of the extension lip is closely attached to a surface of the roof panel, and has a tapered cross sectional shape.

6. A structure for mounting a roof molding on a vehicle according to claim 5, wherein an upper projection portion is formed at a right end of the head portion of the roof molding and contacts with an inner surface of the second wall portion in the side outer panel.

7. A structure for mounting a roof molding on a vehicle according to claim 5, wherein the right end of the head portion is positioned in an upper side of the groove portion and arranged apart from the second wall portion constituting the right wall surface of the groove portion.

8. A structure for mounting a roof molding on a vehicle according to claim 7, wherein a lower projection portion is positioned at the same height as the main lip, located above the leg portion and contacts with the second wall portion constituting the right wall surface of the groove portion.

9. A structure for mounting a roof molding on a vehicle according to claim 8, wherein a small lip is formed on a front end of the lower projection portion.

10. A structure for mounting a roof molding on a vehicle according to claim 9, wherein the leg portion is displaced to a side of the side outer panel.

11. A structure for mounting a roof molding on a vehicle according to claim 10, wherein a core member is provided in an inner portion of the roof molding along the longitudinal direction of the vehicle.

12. A structure for mounting a roof molding on a vehicle according to claim 1, wherein an extension lip is formed at a lateral end of the head portion of the roof molding and contacts with the roof panel, and the hollow portion is offset in the opposite direction from the extension lip in the lateral direction.

* * * * *